Sept. 5, 1961  S. BURRITT, JR., ET AL  2,998,635
METHOD OF MAKING ROLLER BEARINGS
Filed Jan. 22, 1959
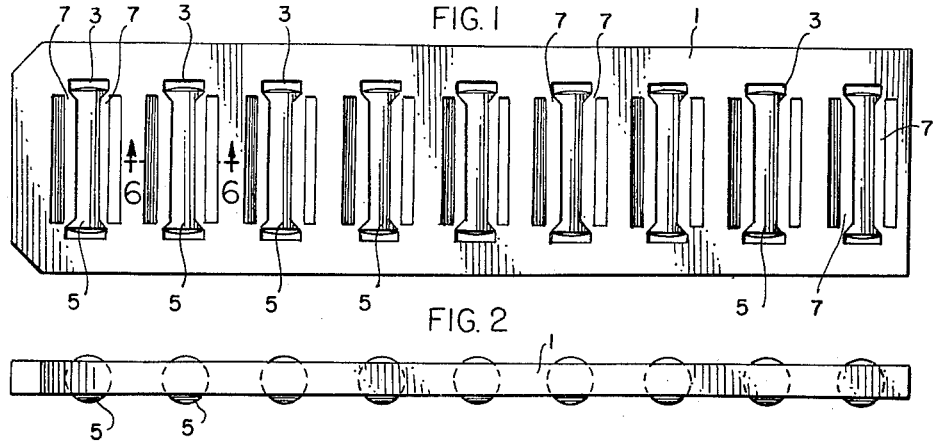
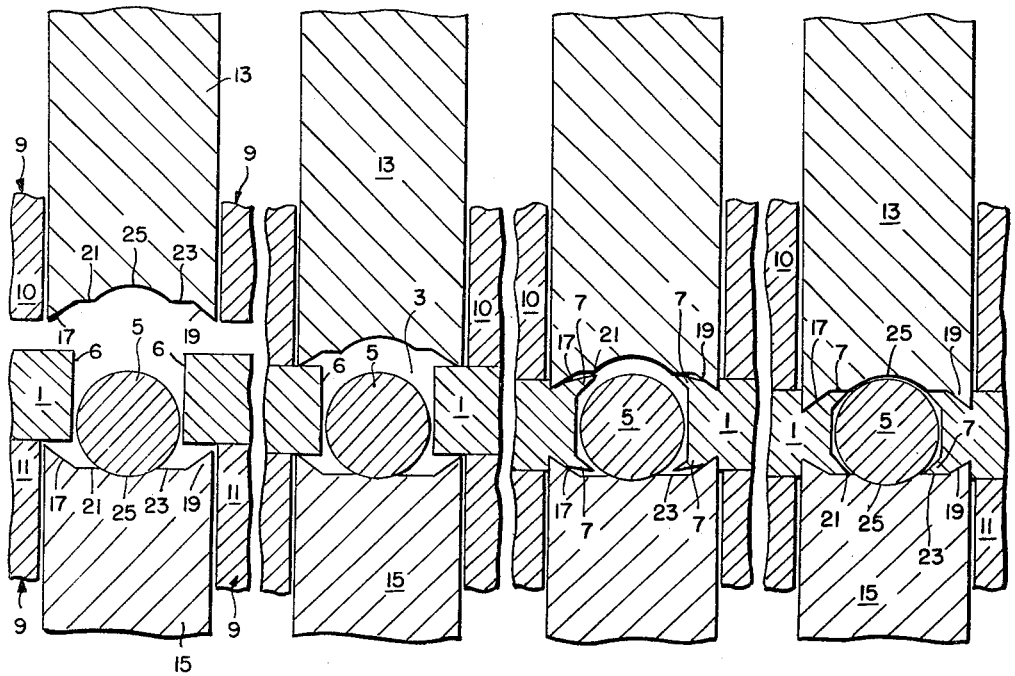
INVENTORS:
SILVIUS BURRITT, JR.
DAVID H. ELLIS
BY
ATT'YS United States Patent Office 2,998,635
Patented Sept. 5, 1961

2,998,635
METHOD OF MAKING ROLLER BEARINGS
Silvius Burritt, Jr., Bensenville, and David H. Ellis, West Chicago, Ill., assignors, by mesne assignments, to The Oscar C. Rixson Co., Franklin Park, Ill., a corporation of Illinois
Filed Jan. 22, 1959, Ser. No. 788,466
1 Claim. (Cl. 29—148.4)

The present invention pertains to an improved ladder-type roller bearing construction adapted to accommodate a plurality of roller bearings in spaced relation within a single piece retainer unit and particularly to a unique process for making such a construction.

It is widely recognized that the use of a plurality of roller bearings between two relatively movable surfaces results in a reduction of friction which is particularly significant if the relatively movable surfaces are to be frequently and repeatedly used. However, prior methods of retaining such roller bearings in position between such surfaces have required costly retainer constructions and assembly procedures which often has made their use uneconomical.

One of the basic requirements for a roller bearing unit is that the bearing surfaces must be spaced from each other so that no friction will be occasioned by the oppositely rotating adjacent cylindrical surfaces of the bearings. Thus some retainer means is necessary to secure these bearings in a spaced relationship while permitting the bearings to rotate freely. However, all retaining means are not equally effective since the efficiency of the roller bearing is limited by the friction which is occasioned by the retention of the bearing. Most prior roller bearing units have operated on two principles. The first of these principles is the utilization of a roller bearing having a reduced diametrical portion adjacent the end which may be received in a retaining means having circular apertures and a thickness which is less than the diameter of the larger diametric portion of the roller bearing. Obviously such an arrangement is practical only for those roller bearing units utilizing roller bearings of sufficient size to accommodate proportionalities of this dimension. However, in dealing with roller bearings of the type known as needle bearings not only is it extremely difficult to form such bearings with differing diameters, but practically impossible to utilize a retaining means having sufficient thickness to accommodate the reduced diametrical portion yet thinner than the diameter of the bearing rollers; such proportionality being necessary if the roller bearing surfaces on both sides of the retainer are to be available to contact and support the relatively movable load surfaces. A further method has been to ignore the thickness of the retention means in comparison to the diameter of the bearing rollers and to make the rollers sufficiently long to accommodate the relatively movable load surfaces between retaining side portions. This, of course, significantly reduces the ratio of weight bearing surface presented for use to the total surface occupied by such a bearing unit. Indeed, further difficulties are encountered because of the limitations of space in certain types of mechanisms which particularly do not admit of extraneous space to accommodate non-useful portions of the retainer structure.

Even greater difficulties are encountered where one of the relatively movable surfaces is formed to retain the bearings in spaced relationship. In such an arrangement, manufacturing techniques are necessitated which significantly increase the cost of affording roller bearing protection. Such a solution creates new problems which offset the advantages gained, these are; the sacrifice of the strength of the surface to accommodate the bearings, the tedious labor consuming initial assembly, the difficulty of inspection of the bearing units to determine wear condition, and the taking of the mechanism out of use for significant periods of time in order to replace worn bearing surfaces.

Thus, a roller bearing unit which can be inexpensively manufactured to present a high ratio of bearing surface per unit area and which is capable of being placed between two relatively movable parts without necessitating the adaptation of either of the parts to the accommodation of the unit, and which may be easily replaced, inspected, and initially assembled into the composite unit, is a considerable advance over all prior solutions. Therefore, it is a purpose of this invention to provide an improved method of making roller bearing units so that they can be inexpensively manufactured to provide a high ratio of bearing surface per unit area and which may be utilized between two relatively movable surfaces without necessitating the adaptation of either of the parts to the reception of the bearing unit.

In retaining means for a roller bearing unit, it is very important, if full efficiency is to be realized, that the retainer means does not present significant frictional impediment to the operation of the roller bearing. During the movement of two load surfaces relative to each other, a plurality of rollers located therebetween tend to rotate in accordance with the relative movement of the surfaces. Thus the tendency of such bearings in such activity is to maintain their normal spaced relationship, there being no appreciable component of force tending to change this spacing. Thus ideally, a roller bearing retainer should permit a sufficient portion of the roller surface to be exposed to both load surfaces to provide good load carrying contact with the surfaces. Further, such a retainer should not interfere with the rotation of the rollers during the relative movement of the load surfaces. However, even when the retainer comes into play to maintain the spaced relationship between the rollers, the retaining surfaces which contact the rollers should be minimized so as to reduce the friction encountered by the retaining action. Therefore, it is a further object of this invention to provide an improved method of making a roller bearing unit comprising a retainer adapted to hold a plurality of bearing rollers in spaced relation therein while permitting said rollers to rotate freely with respect to said retainer, to provide an assembly method which permits sufficient exposure of roller bearing surface to each of the relatively movable load bearing surfaces to provide good bearing contact with the said surfaces, and to provide a method of assembly which requires a minimal retainer surface for contacting the rollers thereby minimizing the friction occasioned by the retainer structure.

To accomplish the foregoing objectives the instant invention utilizes a solid one-piece retainer having a plurality of laterally spaced elongated roller containing apertures each of which, in transverse cross section, has lateral recessed portions which are farther apart than the diameter of the roller element to be accommodated, and which has a width adjacent each of the face surfaces of the retainer body which is less than the diameter of the said roller element.

While the attributes of the aforesaid retainer and the roller housing apertures are recognizable in view of the present teaching, the method of making a retainer having such apertures, which is inexpensive, efficient and certain to achieve the configuration aforementioned, is critical to the commercial realization of the aforementioned unit.

Therefore it is a further object of this invention to provide an improved method of making and assembling a bearing unit which is capable of simultaneously forming a plurality of retaining means to retain a plurality of rollers within a bearing assembly; which is capable of securing roller members within a retaining unit in a precise manner to relatively close tolerances; which effects a certain securing of the roller members with respect to the retainer body yet permits the rollers to rotate freely relative thereto; and which insures that the retainer will not interfer with the rollers in contacting and supporting two relatively movable load surfaces.

Further objects and advantages of this invention will become evident as the description proceeds and from an examination of the accompanying drawings which illustrate a specific embodiment according to the invention.

In the drawings:

FIGURE 1 is a top plan view showing a specific embodiment of a bearing unit made according to the invention.

FIG. 2 is a side elevational view of the embodiment shown in FIG. 1.

FIG. 3 is an enlarged, fragmentary, and somewhat schematic sectional view showing an apparatus for forming a roller bearing according to the present invention and illustrating the first procedural step in the process of securing a roller in the retainer body.

FIG. 4 is a view similar to that of FIG. 3 showing the process at the stage where the retainer body is about to be formed to secure the roller in the roller recess of the retainer.

FIG. 5 is a view similar to that shown in FIGS. 3 and 4 showing the manner in which the margins of the roller recess are formed to retain the roller, and FIG. 6 is a view similar to FIGS. 3, 4, and 5 showing the process completed and with the upset margins of the retainer body recess on either side of the roller being rendered coplanar with the face surfaces of the retainer. This view shows a section of the completed bearing structure as taken on line 6—6 of FIG. 1.

Referring to FIGURE 1, a bearing unit made according to the invention, in the form of a ladder-bearing unit, is shown in its final assembled form and as including an elongated retainer 1, which is relatively long in relation to its width and relatively thin in proportion to either of the aforesaid dimensions. Retainer 1 is formed with a plurality of parallel elongated transversely extending apertures 3, spaced uniformly along the length of the retainer, adapted to receive a plurality of elongated cylindrical roller bearing members 5. Initially the apertures 3 are of rectangular straight-sided form, punched or stamped into the retainer body 1, which is a solid one-piece structure. The formation of the aperture walls 6 to retain the rollers will hereafter be explained.

As viewed in FIG. 6, it is seen, in cross section, that the central portion of the transverse retainer walls forming each aperture 3, in the completed bearing, are separated by a distance greater than the diameter of the roller bearing to be accommodated. However, as the side walls of the retainer aperture approach the upper or lower face surfaces of the retainer body 1, they protrude inwardly to form overhanging lips 7 which form a surface opening having a width less than the diameter of the roller bearing to be accommodated. This reduced width prevents the roller from being moved vertically out of the retainer aperture, yet because of the increased width of the aperture in the central portion, the roller bearing is permitted to freely rotate within the aperture. Further, only the elongated edge portions of the lips 7 contact the bearing surface to retain the roller bearing within the aperture as indicated in FIGS. 1 and 6.

As shown in FIG. 6 this shape is imparted to the walls of the aperture by staking the retainer member 1 on each surface, and on each side of each elongated aperture to cause the metal adjacent the surfaces to be extruded over the opening to form the roller retaining lips 7. Since in the present instance the aperture is elongated, the staking should occur adjacent a substantial length of the sides of each of the apertures to form elongated lips and provide retention along a substantial portion of the roller length.

Thus the elongated lips serve to insure that the rollers will be substantially parallel to each other and to the retainer surface while allowing sufficient projection of the rollers beyond the surfaces of the retainer body to space the retainer away from the relatively movable load surfaces between which the bearing is installed.

It is to be further noted from FIG. 6 that as the metal is extruded or spilled over the roller aperture to form the lip portions 7, these lip portions are compressed inwardly so as not to project beyond the planes of the upper and lower surfaces of the retaining member. Thus, these lip portions will not interfere with the roller bearing surfaces which are exposed to contact the relatively movable load surfaces. Further, this compression assures uniform lip formation to provide accurate centering of the roller bearings with respect to the apertures. The bearing unit so formed can thus be made to comply with relatively fine tolerance requirements which increases the adaptability of the unit for use in varied installations.

While it is easily recognized that the bearing unit described has many advantages, yet the problem remains of making such a bearing unit having apertures of generally the described configuration and assembling the bearing elements therein without unduly expensive manufacturing techniques and in a manner which obviates the labor ordinarily needed for accurate, uniform assembly of such units.

Therefore, this invention is concerned with a method of manufacturing a bearing unit particularly applicable to units of the aforesaid description. In this process an initial step is to stamp a retainer member out of a single piece of blank metal which member has a plurality of longitudinally spaced, generally rectangular apertures. In FIG. 3 is seen a cross sectional view of such an aperture as it is to be formed by the initial stamping process. The side walls of the aperture, are seen as substantially parallel, flat surfaces normal to the face surfaces of the body 1, the distance between the walls being in excess of the diameter of the bearing element to be accommodated. A collateral step in the manufacturing process is, of course, the making of a plurality of bearing members adapted to be received within the apertures of the retainer.

In the subject method, the steps of assembling and forming the means for retaining the bearing elements within a retainer are accomplished contemporaneously by the consecutive steps shown in FIGS. 3, 4, 5 and 6, which steps may be accomplished with a single operation of conventional press apparatus. In these figures, a spring loaded stripper shown diagrammatically at 9 includes upper jaws 10 and lower jaws 11 which are located on either side of an upper staking punch 13 and a lower staking punch 15 respectively.

In the initial positions, the upper jaws 10 of the spring loaded stripper 9 are raised a sufficient distance to allow the retainer to be inserted between the jaws of the stripper to permit the portions of the retainer on either side of the openings to rest upon the lower stripper jaws 11 so that the opening is centrally located in relationship to the lower staking punch 15. The configuration of the staking punches 13 and 15, shown in cross section in FIGS. 3, 4, 5 and 6, is to be particularly noted. In the form shown, each of the staking punches is an elongated member, of somewhat less length than the aperture 3, having a cross section which is uniform throughout the effective length. In cross section it is seen that each of the wedge shaped portions 17 and 19 recede inwardly from the sides of the punches to form tapered pointed knife-like stakes which terminate in two elongated shoulder portions 21 and 23 located on either side of a partially cylindrical shaped recess 25. These recesses 25 are formed to the same annular configuration of the bearing element but with a slightly greater diameter. Thus, when the retainer is placed upon lower stripper jaws 11 it is important that the cylindrical recess 25 be located centrally in relationship to the transverse walls of the openings in order to properly position and hold the bearing element during the assembly operation.

While the spring loaded stripper is shown diagrammatically as used only in connection with a single opening, it is to be emphasized that for each opening in the retainer there will be a corresponding combination of upper and lower stripper jaws and upper and lower staking punches, having the same configuration as those shown in FIG. 3 and acting simultaneously therewith.

As shown in FIG. 3, after the retainer is in place with respect to the lower staking punch 15 and the cylindrical recess 25, a cylindrical roller bearing is placed in each opening and is held in centered position by the cylindrical recess 25 formed within the lower staking punch 15.

In FIG. 4, upper staking punch 13 and upper stripper jaw 10 are moved downwardly until engagement is made with the upper surface of the retainer body 1. Contemporaneous with this movement is that downward movement of the lower stripper jaw 11 to bring the lower staking punch 15 into engagement with the lower surface of the retainer.

Further movement of the upper staking punch toward the other initiates the upsetting of the metal at the margins of the opening 3 in retainer 1, and in each face thereof, to form the inwardly projecting elongated lip portions 7, as best seen in FIGURE 5. It will be noted that in FIG. 5 the lip portions project inwardly adjacent the upper and lower surfaces of the retainer to constrict the opening 3 at both surfaces of the retainer 1. It is further to be noted that at this stage in the upsetting of staking process the lip portions 7 project above the upper surface of the retainer and below the lower surface of the retainer which would tend to minimize the bearing element surface available for contacting and supporting the relatively movable load surfaces. Also when the lip portion 7 extends above and below the respective surfaces of the retainer the distance between the upper and lower lip portions permit a relatively large movement of the bearing element before it would contact the lip portions of the retainer.

Therefore, in FIG. 6 it is seen that as the upper staking punch continues its downward movement toward the other punch, the elongated shoulder portions 21 and 23 located on either side of the partially cylindrical shaped recess 25 of each staking punch, compress lip portions 7 so that the outer surfaces of these lip portions are forced into substantial coplanar relation with the upper and lower surfaces of the retainer member respectively; that is, the width of the opening, as measured between the upper and lower lip portions, is substantially equal to the thickness of the retaining member body.

By forcing these lip portions inwardly in relationship to the width of the retaining member the bearing element is very precisely centered within the aperture and is permitted to move only slightly in relationship to the retainer. It is therefore evident that by controlling the configuration of the shoulder portions 21 and 23, relatively precise tolerances can be afforded which would constrain the roller bearing to move in only a very limited vertical and horizontal direction relative to the retainer. This precision of centering and limited tolerance allows this particular process to be used to make bearing units for use in relatively precise installations.

At the conclusion of the compression of the lip portions 7, the upper staking punch and its associated stripper are raised, the upper punch 13 preceding the stripper jaw 9. Simultaneously the lower stripper 11 is raised and the retainer with the bearing element assembled therein is released from the lower punch 15 for removal from the press apparatus.

The main advantages of the improved bearing assembly method of this invention reside in the fact that it permits a simplified bearing construction which can be inexpensively manufactured by substantially a single pressing operation; in the fact that the method utilizes a one-piece retainer body that can be made as a single simple stamping and thereby greatly reduces assembly labor and time; and in the fact that by the method roller bearings can readily be made to exacting precision requirements and to conform to substantially any form of load bearing surface with which they are to coact.

Further advantages are to be found in the unique method of manufacturing a bearing unit which method simultaneously accomplishes the formation of means for retaining a rolling bearing element within the unit and the assembly of the bearing element into the retainer; which is capable of simultaneously forming means for securing and assembling a plurality of rolling bearing elements within a one-piece retainer body; and which is inexpensive and efficient in mass production operation.

Although but one specific embodiment according to this invention has been herein shown and described, it will be understood that details of the construction and method shown may be altered or omitted without departing from the spirit of the invention as defined by the following claim:

We claim:

The method of making a roller bearing unit comprising the steps of stamping a metal blank to form a solid retainer having a plurality of laterally spaced and transversely extending openings therethrough, placing the blank between a pair of opposed staking punches each having stakes formed to deform inwardly the upper and lower lengthwise margins at each side of an opening of the blank, positioning an annular roller bearing in the blank opening with the bearing resting upon the lower of said staking punches in centered position relative to said opening and at an elevation relative to the lower punch stakes such that the bearing centerline will be midway between the upper lower faces of the blank when the opposed punches are closed against the blank at the completion of a staking operation, and then driving one punch toward the other to cause the stakes of both punches to deform the upper and lower margin of the blank opening inwardly and form opposed overhanging lip portions for retaining said bearing in said opening.

References Cited in the file of this patent

UNITED STATES PATENTS

| | | |
|---|---|---|
| 848,776 | Sission | Apr. 2, 1907 |
| 1,318,092 | Lockwood | Oct. 7, 1919 |
| 1,966,663 | Drake | July 17, 1934 |
| 2,330,741 | Potter | Sept. 28, 1943 |
| 2,765,203 | Barr et al. | Oct. 2, 1956 |
| 2,881,646 | Farr | Apr. 14, 1959 |
| 2,987,582 | Blazek | Aug. 4, 1959 |

FOREIGN PATENTS

| | | |
|---|---|---|
| 467,936 | Canada | Sept. 5, 1950 |
| 531,579 | Canada | Oct. 9, 1956 |
| 771,256 | Great Britain | Mar. 27, 1957 |